United States Patent [19]

Altman et al.

[11] Patent Number: 5,038,277

[45] Date of Patent: Aug. 6, 1991

[54] ADJUSTABLE BUFFER FOR DATA COMMUNICATIONS IN A DATA PROCESSING SYSTEM

[75] Inventors: Barbara H. Altman; William F. Bruckert, both of Hudson; Alfred J. Dellicicchi, Acton, all of Mass.

[73] Assignee: Digital Equipment Corporation, Maynard, Mass.

[21] Appl. No.: 465,543

[22] Filed: Jan. 12, 1990

Related U.S. Application Data

[63] Continuation of Ser. No. 165,434, Feb. 29, 1988, abandoned, which is a continuation of Ser. No. 549,609, Nov. 7, 1983, abandoned.

[51] Int. Cl.[5] .................................................. G06F 13/14
[52] U.S. Cl. ............................ 364/200; 364/238.4; 364/238.6; 364/239.7; 364/239
[58] Field of Search ... 364/200 MS File, 900 MS File, 364/300; 365/73, 78, 154, 221; 377/56

[56] References Cited

U.S. PATENT DOCUMENTS

| | | | |
|---|---|---|---|
| 3,380,030 | 4/1968 | McMahon | 364/200 |
| 3,432,813 | 3/1969 | Annunziata et al. | 364/200 |
| 3,602,896 | 8/1971 | Zeheb | 364/200 |
| 3,626,376 | 12/1971 | Anderson | 364/200 |
| 3,643,221 | 2/1972 | Chambers | 364/200 |
| 3,699,530 | 10/1972 | Capowski et al. | 364/200 |
| 3,916,388 | 10/1975 | Shimp et al. | 364/200 |
| 3,949,376 | 4/1976 | Ball et al. | 364/200 |
| 4,090,256 | 5/1978 | Hepworth et al. | 365/154 |
| 4,099,231 | 7/1978 | Kotok et al. | 364/200 |
| 4,126,897 | 11/1978 | Capowski et al. | 364/200 |
| 4,131,940 | 12/1978 | Moyer | 364/200 |
| 4,156,288 | 5/1979 | Spandorfer | 365/78 |
| 4,219,874 | 8/1980 | Gusev et al. | 364/200 |
| 4,222,102 | 9/1980 | Jansen et al. | 364/200 |
| 4,236,225 | 11/1980 | Jansen et al. | 364/900 |
| 4,272,809 | 6/1981 | Kadowaki | 364/900 |
| 4,305,138 | 12/1981 | Dakovski et al. | 365/73 |
| 4,309,754 | 1/1982 | Dinwiddie, Jr. | 364/200 |
| 4,314,332 | 2/1982 | Shiragawa et al. | 364/200 |
| 4,314,361 | 2/1982 | Jansen et al. | 365/221 |
| 4,327,411 | 4/1982 | Turner | 364/900 |
| 4,344,132 | 8/1982 | Dixon et al. | 364/200 |
| 4,347,567 | 8/1982 | De Tar, Jr. et al. | 364/200 |
| 4,364,025 | 12/1982 | Dalton | 340/347 DD |
| 4,393,301 | 7/1983 | Svendsen | 377/56 |
| 4,408,272 | 10/1983 | Walters | 364/200 |
| 4,408,275 | 10/1983 | Kubo et al. | 364/200 |
| 4,437,166 | 3/1984 | O'Brien | 364/900 |
| 4,509,115 | 4/1985 | Manton et al. | 364/200 |

OTHER PUBLICATIONS

Alan Weissberger, "FIFOs Eliminate the Delay When Data Rates Differ", 2328 Electronic Design, vol. 29, No. 24, Nov. 26, 1981, pp. 205-214.

"Motorola CMOS Integrated Circuits", 1978, Motorola Semiconductor Products Inc., pp. 7-562 to 7-567.

*Primary Examiner*—Gareth D. Shaw
*Assistant Examiner*—John C. Loomis
*Attorney, Agent, or Firm*—Finnegan, Henderson, Farabow, Garrett, and Dunner

[57] ABSTRACT

A data handling system for transferring data between two units, the data being transferred in blocks of a selected number of data words, up to predetermined maximum number. A buffer stores the data being transferred. The buffer includes a plurality of stages arranged serially from an input end to an output end, the number of stages being equal in number to the predetermined maximum number of data words that may be transferred in a block. If the number of data words being transferred is less than the predetermined maximum number, as indicated by a control signal from the unit transmitting the data, the buffer either receives the data in the stage a number of stages from the output end, or transmits the data from the stage a number of stages from the input end, equal to the number of words being transferred in the block.

29 Claims, 6 Drawing Sheets

ADJUSTABLE BUFFER FOR DATA COMMUNICATIONS IN A DATA PROCESSING SYSTEM

This application is a continuation of Ser. No. 07/165,434, filed Feb. 29, 1988, now abandoned, which is a continuation of application Ser. No. 06/549,609, filed Nov. 7, 1983, now abandoned. The prior application is assigned of record to Digital Equipment Corporation, a MA corporation.

BACKGROUND OF THE INVENTION

1. Field of the Invention

The invention relates generally to digital data processing systems, and more specifically to buffering systems for use in such data processing systems. More specifically, the invention provides a first in-first out buffer of adjustable size, or adjustable numbers of storage locations. This can facilitate the transfer of data between two elements through the buffer since, if the number of data words being transferred is less than the number of locations in the entire buffer, the number of locations in the buffer can be reduced so as to allow the first-loaded data word, after all of the data words have been fully loaded into the buffer, to be at the output end of the buffer and available to be transmitted to the receiving module. The invention thus ensures that time is not spent stepping the data words through the storage locations in the buffer after they have been loaded before the data is sent to the receiving module.

2. Description of the Prior Art

A digital data processing system generally includes three basic elements; namely, a memory element, an input/output element, and a processor element, all interconnected by one or more busses. The memory element stores data in addressable storage locations. This data includes both operands and instructions for processing the operands. The processor element causes data to be transferred or fetched, to it from the memory element, interprets the incoming data as either instructions or operands, and processes the operands in accordance with the instruction. The results are then stored in addressed locations in the memory element. An input/output element also communicates with the memory element in order to transfer data into the system and to obtain the processed data from it. The input/output elements normally operate in accordance with control information supplied to it by the processor element. The input/output elements may include, for example, printers, teletypewriters or keyboards and video display terminals, and may also include secondary data storage devices such as disk drives or tape drives.

It is common in data processing systems to use buffers to synchronize communications among the various elements forming the data processing system. These buffers can be "stacks", or last-in-first-out (LIFO) buffers, in which a receiving module retrieves data words in the reverse order in which they are loaded by a transmitting module. Alternatively, the buffers can be first-in-first-out (FIFO) storage elements in which a receiving module receives data words in the order in which they are loaded by a transmitting module. In some cases, buffers have the capacity for storing only single data words. In that case the LIFO and FIFO buffers are effectively the same. In other cases, the buffers may have several storage locations each of which can store a data word. The capacity of a buffer is selected by a designer based on a number of factors, including the speeds of the modules in transmitting and receiving data and the amount of data that is expected to be transferred between the two modules.

In a data transfer through a multiple-location FIFO buffer, data words are typically serially loaded into an input end, shifted through all of the storage locations in the buffer, and transmitted from an output end. If a transfer is of sufficient data words to use up all of the locations in the buffer, the data for the receiving module is at the output end of the buffer when all of the data have been loaded. However, if the transfer is not of sufficient data words to occupy all of the locations in the buffer, the receiving module will have to enable the buffer control to shift the data words through the buffer to the output end before it can begin receiving them.

A stack or LIFO buffer, on the other hand, does not have this problem. In a stack buffer, the output end and the input end are the same; data words do not have to be shifted through the buffer to reach the output end. However, two problems arise from the use of a stack buffer in some circumstances. First, the order of the data words received by a module from a stack buffer is reversed from the order in which they are loaded into the buffer. If the order is important to the receiving module, it will have to be designed with that buffering limitation in mind. Second, since the input and output ends are the same, only one module, the transmitting or receiving module, can use the stack buffer at a time, either to load or receive data. With a FIFO buffer, this limitation does not exist; the transmitting module can load data into the input end of a FIFO buffer at the same time that the receiving module is receiving data therefrom.

SUMMARY OF THE INVENTION

The invention provides a new and improved first-in-first-out, or FIFO, buffer for buffering data transfers from a transmitting unit to a receiving unit, which enables the receiving unit to be able to immediately withdraw data words from the buffer without having to step them through any empty locations to the output end of the buffer. The data words are transferred by the transmitting unit in a block of one of several selected sizes, and the transmitting unit transmits a signal along with the data which identifies the number of data words in the block being transferred. A buffer control circuit receives the block size identification signal and determines the number of storage locations needed in the buffer to store all of the data words in the block. The buffer control circuit enables the data words to be loaded into the buffer starting at a storage location a selected number of storage locations from the output end, the number of locations equaling the number of data words in the block. Thus, when the receiving unit desires to receive the data, the first data word is at the output end of the buffer; the receiving module does not need to shift data words through the buffer to make them available to it at the output end.

BRIEF DESCRIPTION OF THE DRAWINGS

The invention is pointed out with particularity in the appended claims. The above and further objects and advantages of the invention may be better understood by referring to the following description taken in conjunction with the accompanying drawings in which:

DESCRIPTION OF THE PREFERRED EMBODIMENTS

Figure 1:
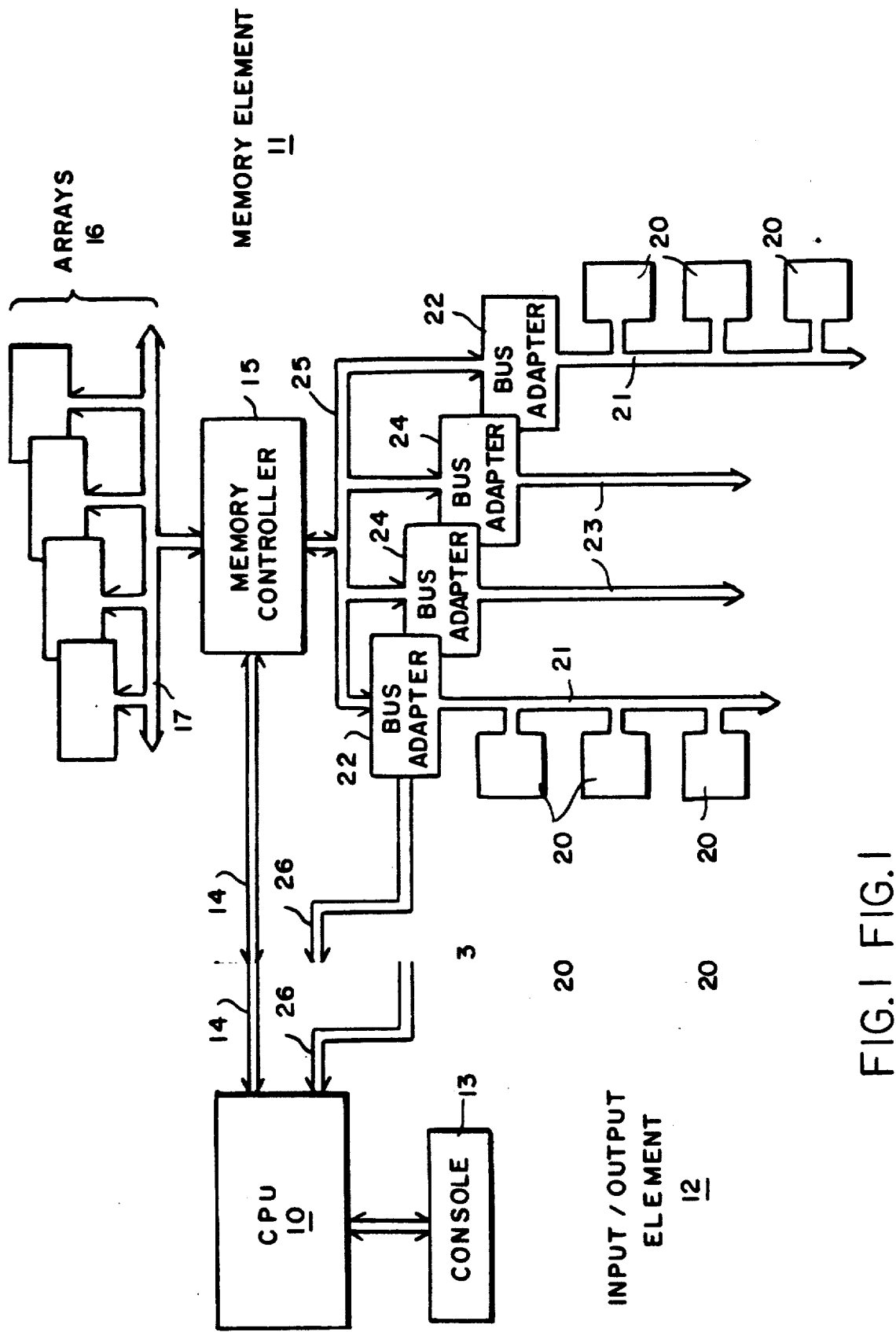
FIG. 1 is a general block diagram of a digital data processing system incorporating a buffer constructed in accordance with the invention.

As exemplified in FIG. 1, the basic elements of a data processing system including the invention comprise a central processor unit (processor) 10, a memory unit 11, and an input/output element 12. The processor 10 executes instructions that are stored in addressable storage locations in the memory unit 11. The instructions identify operations that are to be performed on operands, which are also stored in addressable locations in the memory unit. The instructions and operands are fetched by the processor 10 as they are needed, and processed data are returned to the memory unit. The processor 10 also transmits control information to units in the input/output element, enabling them to perform selected operations, such as transmitting data to or retrieving data from the memory unit 11. Such data may be instructions, operands which may be transmitted to the memory unit or processed data which is retrieved from the memory for storage or display.

An operator's console 13 serves as the operator's interface. It allows the operator to examine and deposit data, halt the operation of the central processor unit 10, or step the central processor unit through a sequence of instructions and determine the responses of the processor in response thereto. It also enables an operator to initialize the system through a boot strap procedure, and perform various diagnostic tests on the entire data processing system.

The central processor unit 10 is connected to the memory unit 11 through several buses generally identified by the reference numeral 14. Specifically, the central processor unit 10 is directly connected to a memory controller 15, which, in turn, connects to a plurality of arrays 16 over an array bus 17. In one specific embodiment, the memory controller also houses a cache memory. Memory controller 15 includes circuitry for retrieving the contents of an addressed location from either the cache or the arrays 16 and for storing information therein in a conventional manner. Cache memories are well-known in the art and will not be discussed further.

The data processing system may include several types of input/output units, including disk and tape secondary storage elements, teletypewriters, keyboards and video display terminals, and the like. These units 20 are connected through an input/output bus 21 to a bus adapter 22. The input/output bus 21 may be as described in U.S. Pat. No. 4,232,366, which was issued in the name of John V. Levy, et al, and assigned to the assignee of the present invention, the patent entitled "Bus For Data Processing System With Overlap Sequences". Other types of input/output buses may also be used to connect to similar input/output units (not shown), including an input/output bus 23, connected to a bus adapter 24, which may be as described in U.S. Pat. No. 3,815,099, issued June 4, 1974, in the name of J. Cohen et al, and entitled "Data Processing System".

The bus adapters 22 and 24 are connected to transmit and receive data from memory controller 15 over an adapter bus 25. The bus adapters are also connected by an interrupt request/grant bus 26, over which the bus adapters can interrupt the processing of central processor unit 10 in the event of a change of status of one or more of the input/output units 20 in a conventional manner. The central processing unit 10 thus transfers interrupt grant signals directly with units in the input/output element, and transmits control information to, and receives status information from, the units in the input/output element 12 through memory controller 15. The memory controller thus controls the transfer of data to and from the central processing unit 10 and the input/output element 12, and the transfer of control and status information between the central processing unit and input/output element 12.

Prior to describing the new buffer, it will be helpful to describe the portion of one embodiment of the data processing system depicted in FIG. 1 in which the buffer is located. In one specific embodiment, the new buffer is used to buffer transfers between memory controller 15 and memory arrays 16.

Figure 2:
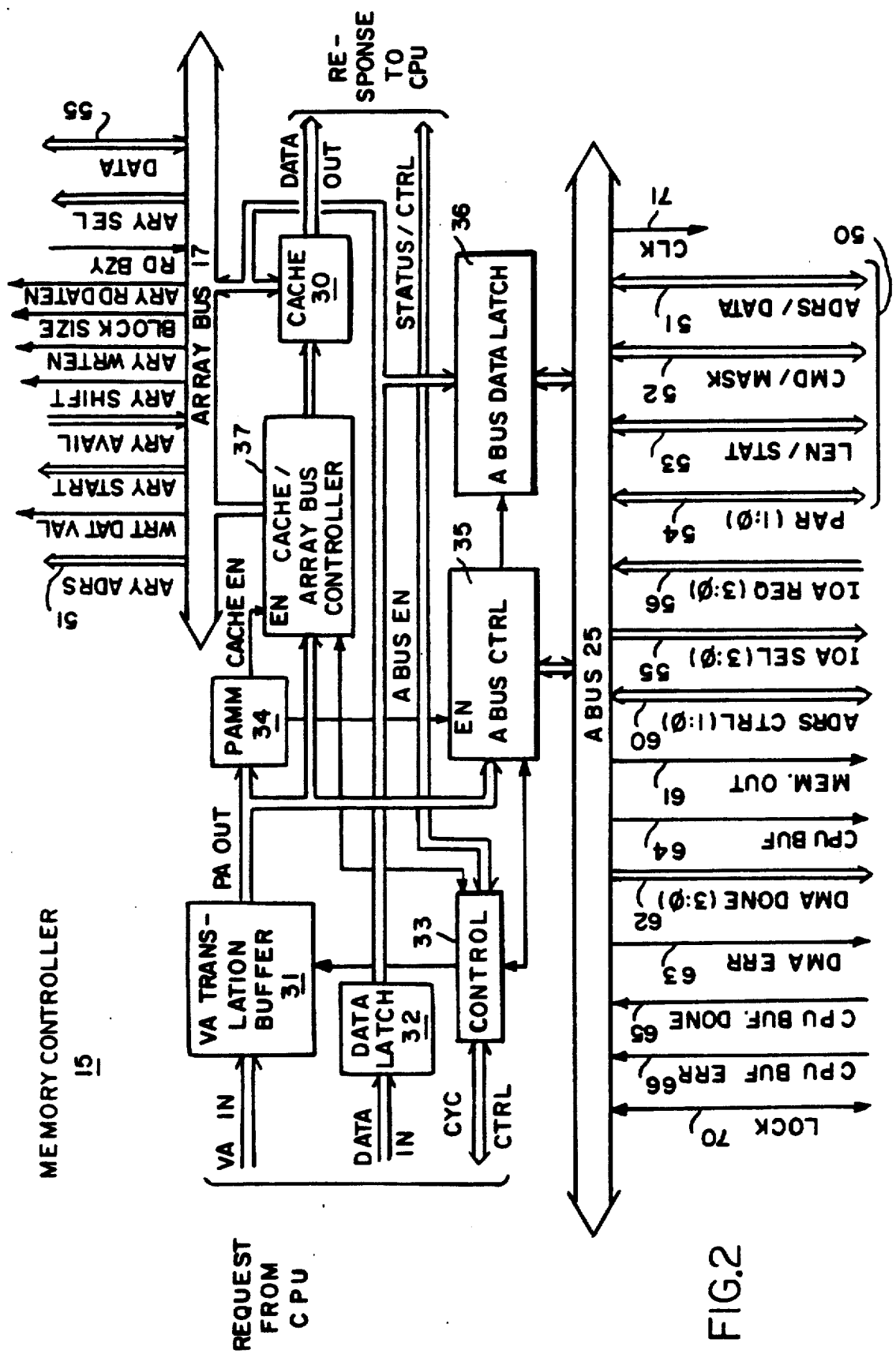
FIG. 2 is a block diagram of a memory controller included in the data processing system depicted in FIG. 1, and which is useful in an understanding of the invention.

With reference to FIG. 2, when memory controller 15 receives a memory request from central processor unit (FIG. 1), it receives virtual address signals in a translation buffer 31, data signals in a data latch 32 if the transfer is a WRITE operation, and receives and transmits cycle control signals in a control logic 33, the latter including timing signals, READ/WRITE operation enabling signals, acknowledgement signals and so forth. The translation buffer translates the virtual address in a conventional manner and transmits PA OUT physical address signals to a physical address memory map 34. The physical address may identify either a location in a cache 30 or in one of the arrays 16, on the one hand, or in the input/output element 12. If the PA OUT physical address signals identify a location in input/output element 12, the physical address memory map 34 transmits an ABUS EN adapter bus enable signal, which enables control circuitry 35 and a data latch 36 to engage in a transfer over adapter bus 25. Transfers over one embodiment of adapter of adapter bus 25 are described in U.S. Pat. application Ser. No. 549,608 filed Nov. 7, 1983, and will not be described further herein. However, if the PA OUT physical address signals identify a location in cache 30 or one of arrays 16, the physical address memory map 34 transmits a CACHE EN enabling signal to a cache/array bus controller 37. Controller 37, in turn, determines whether the data identified by the physical address is in cache 30 or only in arrays 16. If the data is in cache 30, the controller 37 enables the cache to store the data from the data latch 32 if the operation is a WRITE operation, or to transmit the data, if the operation is a READ operation, as DATA OUT signals to the central processing unit 10. The control logic 33 also transmits status and control signals to the central processing unit.

Before proceeding further, it will be helpful to present a description of a cache 30 which is used in memory controller 15. A cache memory works on the principle that a central processor unit 10 normally will access (that is, read data from or write data into) memory locations adjacent or very near to locations which it has recently accessed. A cache typically contains a small number of storage locations, smaller, that is, than the number of storage locations in an array. The locations in the cache are accessible quickly and thus if an item is in the cache, it can be transmitted to the central processing unit relatively quickly after the request is made. The storage locations in one embodiment of the cache 30 are divided into blocks of four storage locations each. Each block contains a copy of the data stored in four contiguous locations in an array, the data being selected because it is near to data which has recently been accessed by the central processing unit. The blocks in cache 30 are assigned addresses corresponding to the address of the corresponding data in the array 16. Controller 37 maintains a list of the addresses of the blocks in cache 30, and thus can determine whether the requested locations are in the cache, or whether it will have to retrieve a block of data from array 16 and establish a block in the cache for the requested data.

When a central processor unit 10 retrieves data from the memory element 11, if the cache/array bus controller 37 finds that the requested data is not in cache 30, it will initiate a transfer over array bus 17 to transfer an entire block of data around the requested location from array 16. This block of data is stored in the cache, and the data from the addressed storage location is transmitted to the central processor unit. If the central processor unit then reads an adjacent location, the cache/array bus controller 37 will typically find the data from the requested location in the cache. No transfer from the array is required to complete the READ operation.

When data is written into the memory by the central processor unit, the data is loaded into an addressed block in cache 30. Then one of two operations can occur. If the cache 30 is a "write-through" cache, cache/array bus controller 37 also immediately enables the data word to be written into the addressed location in arrays 16. If the cache 30 is a "write-back" cache, each block contains a flag which indicates whether the central processing unit has written data into it. If data has been written into a block, controller 37 may periodically enable the cache 30 to transmit the data from the entire block into the corresponding locations in arrays 16.

It can be seen that in transfers from cache 30 to arrays 16, during a "write-back" operation, blocks of data from four locations will normally be written into the arrays. However, on transfers from one embodiment of adapter bus 25, the block size may be any number of data words from one to four, with each data word being stored in one location in arrays 16, with the most common number of data words transferred from that embodiment of the adapter bus being two. Thus, while the cache transfers block of four words to arrays 16, transfers from the adapter bus 25 to the arrays 16 normally occur in blocks of two data words.

Figure 3:
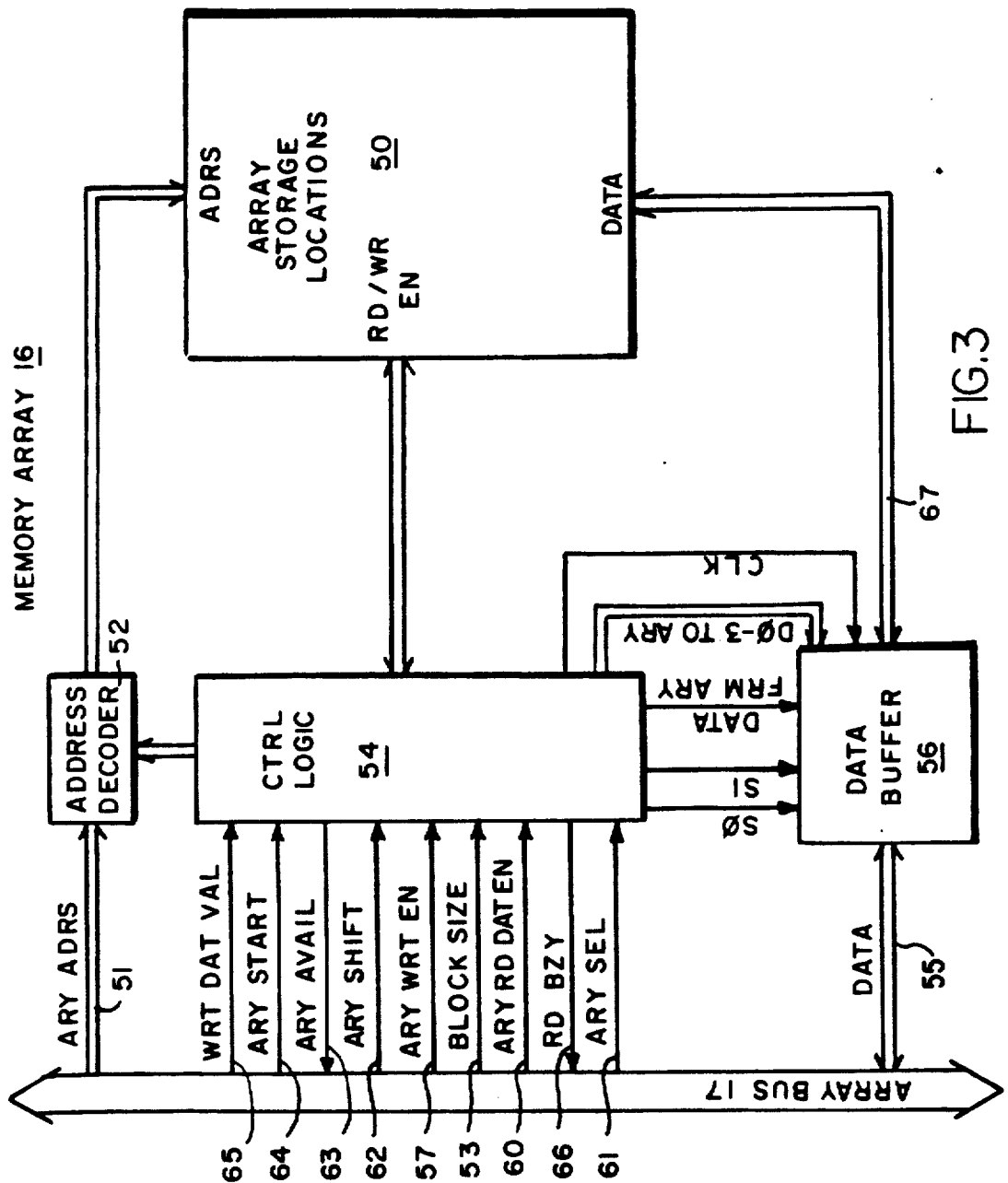
FIG. 3 is a block diagram of a memory array which is used with the memory controller depicted in FIG. 2 and which includes a buffer constructed in accordance with the invention.

As has been mentioned, on accesses to memory, if the physical address provided by translation buffer 31 does not identify a location in block in cache 30, the cache/array bus controller 37 will perform an operation over array bus 17 with arrays 16. FIG. 3 illustrates a general block diagram of an array which may be used in connection with the memory controller 15 depicted in FIG. 2.

As shown in FIGS. 2 and 3, the array bus 17 connecting memory controller 15 and an array 16 includes a plurality of lines for carrying address, data and control signals. In one specific embodiment, the memory controller transmits array address signals on lines 51 which identify the block address, either lowest, or highest, address in the array into which the data will be written. Address decoder 52, enabled by array control logic 54, automatically increments the address it receives from address lines 51 to access the remaining locations in the block. For a WRITE operation, a BLOCK SIZE signal on a line 53 to control logic 54 identifies the number of words in the block to be written into storage locations 50. The data words themselves are transmitted over lines 55 to the data buffer 56.

In addition to these signals, a number of other control signals are transmitted over array bus 17. An ARY WRT EN write enabling signal on line 57 and ARY RD DAT EN read enable signal on line 60 indicate whether the operation is a READ or WRITE operation An ARY SEL array select signal on line 61 enables one of the arrays to engage in a transfer. An ARY SHIFT array shift signal on line 62 enables control logic 54 to, in turn, enable data buffer 56 to shift data into data buffer 56 from data lines 55 during a WRITE operation or to shift the data from buffer 56 onto data lines 55 during a READ operation. An ARY AVAIL array available signal on lines 63 from each array 16, when asserted indicates that the array is available for an operation transfer, and an ARY START signal on line 64, when asserted, indicates that the array is to begin performing the transfer indicated on the other control lines. A WRT DAT VAL write data valid signal on line 65 is a timing signal which control logic 54 uses to enable data buffer 56 to receive the data from lines 55 during a WRITE operation. Finally, a RD BZY read busy signal, transmitted by control logic 54 to memory controller 15, indicates that the array is in the process of retrieving data from an addressed location during a READ operation. When the signal is negated, the read data is available to the memory controller in data buffer 56.

During a WRITE operation from adapter bus 25 or cache 30 to the storage locations 50 on array 16 (FIG. 3), the array control logic 54 first enables all of the data words in the block being transferred to be accumulated in data buffer 56 from the array bus 17. After the entire block has been stored in the buffer, the control logic 54 enables them to be transmitted to storage locations 50. The number of data words in the block is indicated by the condition of the BLOCK SIZE signal on line 53. During a READ operation from storage locations 50 to the memory controller 15, the control logic 54 also enables a block of data to be stored in the data buffer 56 before transmitting it onto array bus 17.

Figure 4:
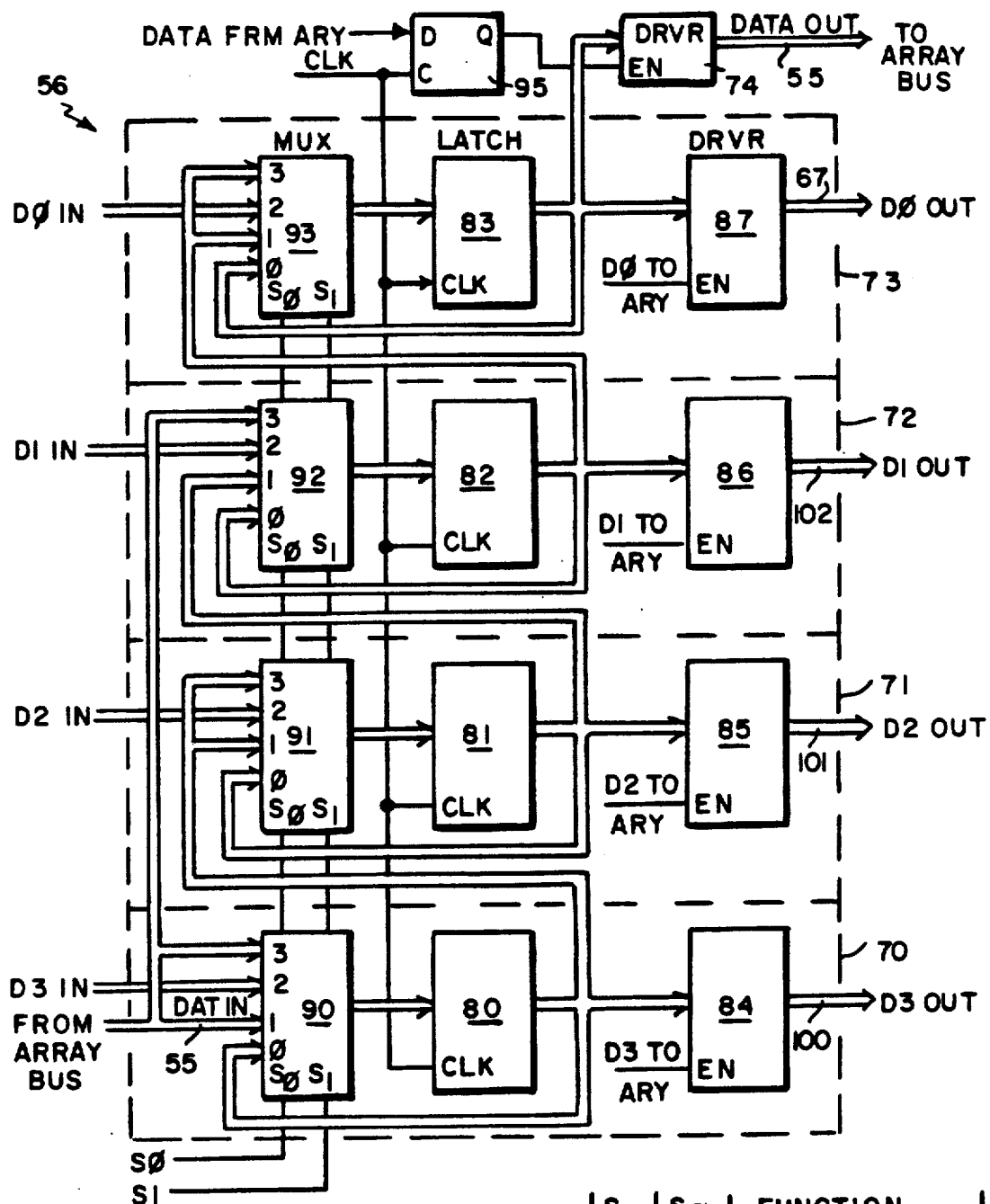
FIG. 4 is a circuit diagram of a data buffer according to the invention useful in the array depicted in FIG. 3.

FIG. 4 contains a circuit diagram of a data buffer 56 constructed in accordance with the invention. The buffer includes four stages 70 through 73, with stage 70 comprising the input stage of the buffer and stage 73 comprising the output stage. In addition, the buffer 56 includes a driver 74 which receives data signals from stage 73 and couples them onto data line 55 of array bus 17 (FIG. 3).

The stages 70 through 73 of the buffer are generally similar in construction and operation. Each includes a data latch 80 through 83, each of which stores a word of data, a driver 84 through 87 which is capable of transmitting the signals in latch 83 onto an output line, and a multiplexer 90 through 93 which selects signals from one of four sources and couples the selected signals for storage in latches 80 through 83. The source selection in multiplexers 90 through 93 is governed by S0 and S1 control signals from control logic 54. Buffer 56 also operates in conjunction with DAT FRM ARY and D0-3 TO ARY direction control signals from control logic 54, and a CLK timing signal, which is also supplied by control logic 54. The CLK timing signal enables latches 80 through 83 to receive and store data from the respective multiplexers 90-93. The DAT FRM ARY signal enables a flip-flop 95 to be set by the CLK timing signal, which, in turn, enables driver 74 to couple the signals from latch 83 onto data line 55. The D0-3 TO ARY signals enable drivers 84-87 to couple the contents of the respective latches onto output lines 67 or 100 through 102.

As has been mentioned, multiplexers 90 through 93 couple signals from one of four sources to the inputs of latches 80 through 83. With reference to the table 109 depicted in FIG. 4, the buffer 56 can perform the following four operations in response to the S0 and S1 control signals:

(A) If both the S1 and S0 function signals are negated, each multiplexer couples the output signals from the latch in its stage to the input of the same latch. Accordingly, each stage holds the data word that is present in the storage in response to the negation of both the S1 and S0 signals.

(B) If the S1 signal is negated, and the S0 signal is asserted, each multiplexer in stages 70 through 73 couple the output of the latch in the preceding stage to the input of the latch in its stage, thereby enabling a shift of data from the input stage 70 towards the output stage 73. Simultaneously, the multiplexer 90 couples the data signals from lines 55 to the input of latch 80 for storage. This is the normal shift operation in a first-in-first-out buffer.

(C) If the S1 signal is asserted and the S0 control signal is negated, buffer 56 is enabled to receive and store the data from the storage locations 50 (FIG. 3) in array 16. The data are coupled through multiplexers 90 through 93 and stored in the respective latches 80 through 83.

(D) In accordance with the invention, when the S1 and S0 signals are both asserted, multiplexers 90 and 92 both are enabled to couple the data word from array bus data line 55 to be stored in their respective latches 80 and 82. Control logic 54 asserts both S1 and S0 control signals in response to the BLOCK SIZE signal on line 53 (FIG. 3) indicating that the block being transmitted on data line 55 is a two word, as opposed to a four word, block. During a second word of a two-word transfer, the control logic 54 also enables both the S1 and S0 control signals to be asserted. With the control signals in this condition, the first word received by buffer 56, which is stored in both latches 80 and 82, is shifted into latches 81 and 83. The second word of the transfer is then stored into latches 80 and 82 through multiplexers 90 and 92.

As a result of this arrangement within buffer 56, the data words of the two-word block are stored in latches 83 and 82, that is, at the output end of the buffer. Accordingly, control logic 54 can immediately begin transferring the data to the memory cells 50. In prior buffers, which do not contain the shift arrangement depicted in FIG. 4, the buffer's control logic would have to enable the buffer to shift the data through the buffer to the output stage, which would require two cycles for a two-word block, before it would be available to be transferred to storage locations 50.

Figure 5:
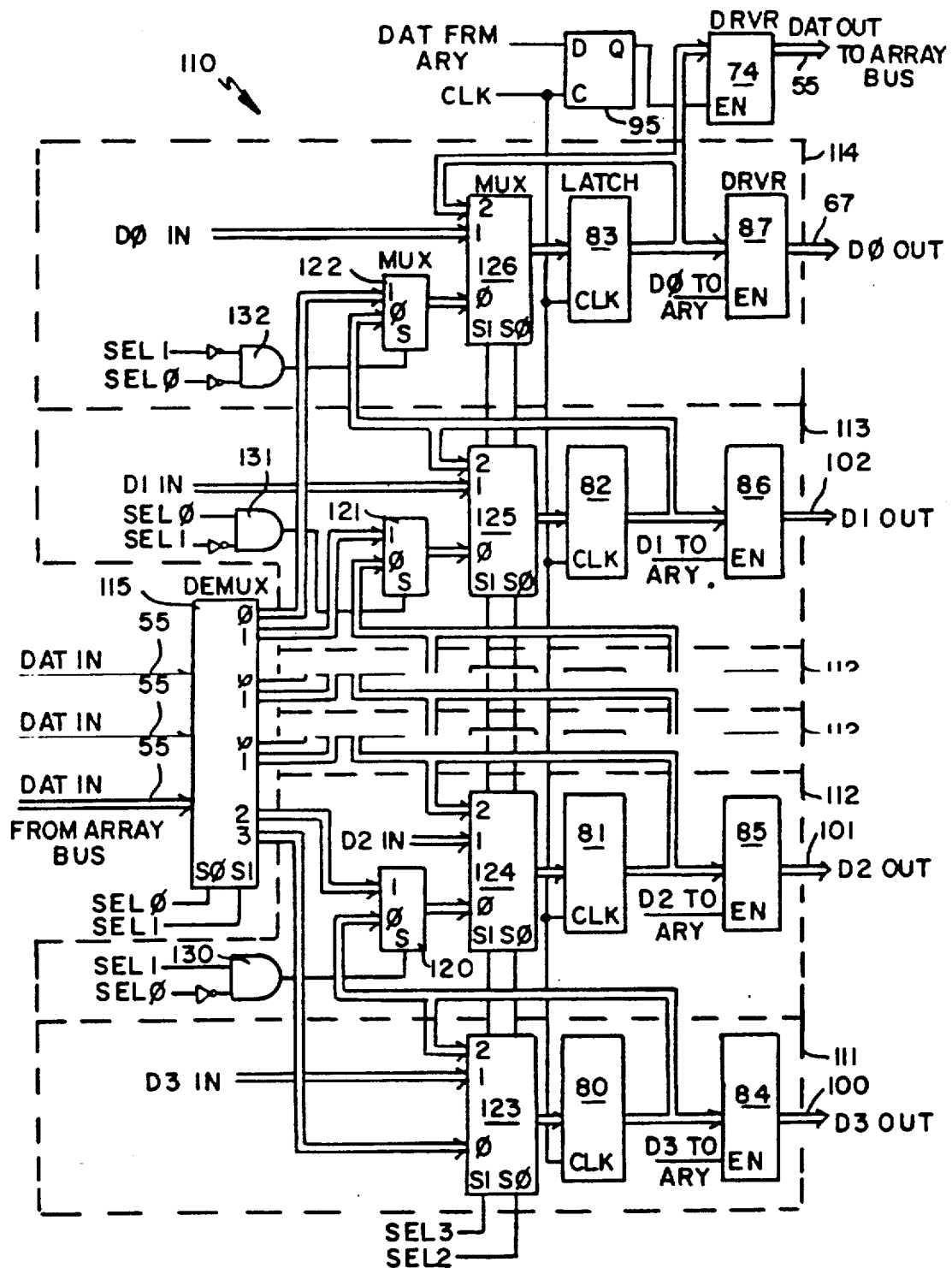
FIG. 5 depicts an alternate embodiment of the data buffer depicted in FIG. 4

FIG. 5 presents a second embodiment of the data buffer, designated by the reference numeral 110, which enables data to be loaded from data line 55 of array bus 17 (FIG. 3) into any of the buffer stages 111 through an output stage 114. Like buffer 56 depicted in FIG. 4, the buffer 110 includes an output driver 74 enabled by a flip-flop 95 to transmit data from the output stage 114 onto lines 55 of array bus 17. Similarly, each stage includes a latch 80 through 83 and driver 84 through 87.

The advantage of buffer 110 is provided by a demultiplexer 115 which couples data words from data line 55 to one of the stages 111 through 114 based on the condition of the SEL1 and SEL0 selection signals, which would be provided by control logic 54. The SEL1 and SEL0 selection signals also control an input multiplexer 120 through 122 in each of stages 112 through 114 of the buffer. These multiplexers enable the stage to couple either (A) the input signal from demultiplexer 115 or (B) the contents from the latch in the preceding stage 111 through 113, t a second multiplexer 124 through 126. Stage 111 does not include a multiplexer corresponding to multiplexers 120 through 122; the data signals from demultiplexer 115 are coupled directly to an input of a multiplexer 123.

Multiplexers 123 through 126 enable the stages 111 through 114 of buffer 110 to perform many of the operations enabled by multiplexers 90 through 93 of buffer 56. Specifically, the multiplexers 123 through 126, under control of SEL3 and SEL2 function control signals supplied by control logic 54, enable the buffer to (see Table 129 on FIG. 5):

(A) Load and shift data words from the data line 55 of array bus 17, if the SEL2 and SEL3 function control signals are both negated, (B) Load from the array storage locations 50, if the SEL 2 signal is asserted and the SEL3 signal is negated, and (C) Hold the data word in the stage, if the SEL3 signal is asserted and the SEL2 signal is negated. If both the SEL3 and SEL2 signals are asserted, no operation is provided.

The variable input stage feature of data buffer 110 is provided by demultiplexer 115 and multiplexers 120 through 122. The selection of input signals coupled through the multiplexers 120 through 123 is governed by AND gates 130 through 132, which are energized by the SEL0 and SEL1 control signals. The four operations enabled in response to the various conditions of the SEL1 and SEL0 control signals are shown in Table 128 of FIG. 5 and are described below in paragraphs (A) through (D):

(A) If the block has four data words, the control logic 54 will be enabled by a BLOCK SIZE signal to assert the SEL1 and SEL0 control signals. The input signals on lines 55 are coupled by demultiplexer 115 to stage 111, and specifically to multiplexer 123. The output signals from AND gates 130 through 132 are all negated, which enable the multiplexers 120 through 122 to couple the output signals from latches 80 through 82 of stages 111 through 113 to the inputs of multiplexers 124 through 126 for storage in latches 81 through 83. Thus the contents of stages 111 through 113 will be shifted one stage towards the output stage 114, and the data from data line 55 will be stored in latch 80 of stage 111. Thus, if the SEL1 and SEL0 signals are both asserted, the input stage is stage 111.

(B) If, however, the block includes three data words, control logic 54 will be enabled to assert the SEL1 signal and negate the SEL0 signal. Demultiplexer 115 couples the data to the "1" input of multiplexer 120 in stage 112. The SEL1 and SEL0 signals also energize AND gate 130, which enables multiplexer 120 to couple the data to multiplexer 124. AND gates 131 and 132 enable their respective multiplexers 121 and 122 to couple the data stored in latches 81 and 82, respectively, to the inputs of multiplexers 125 and 126 for storage in latches 82 and 83. Thus, with the SEL1 signal negated and the SEL0 signal asserted, stage 112 is the input stage.

(C) If the block being transferred is a two-word block, control logic 54 will negate the SEL1 control signal and assert the SEL0 control signal. With the control signals in this condition, demultiplexer 115 couples the data signals from data line 55 to an input of multiplexer 121 in stage 113. AND gate 131 enables multiplexer 121 to couple the data from demultiplexer 115 to multiplexer 125 for storage in latch 82. Simultaneously, AND gate 131 enables multiplexer 122 to couple the data in latch 82 to multiplexer 126 for storage in latch 83. Thus, with the SEL1 signal asserted and the SEL0 signal negated, stage 113 is the input stage. Further, after the entire block is loaded into the buffer, the first data word is present in stage 114.

(D) Finally, if the block being transferred is a one-word block, control logic 54 will negate both the SEL1 and SEL0 control signals. In this condition, demultiplexer 115 couples the data from data line 55 to multiplexer 122. AND gate 132 is energized to enable multiplexer 122 to couple the signals to multiplexer 126 for storage in latch 83. The data word is thus immediately available in stage 114.

Figure 6:
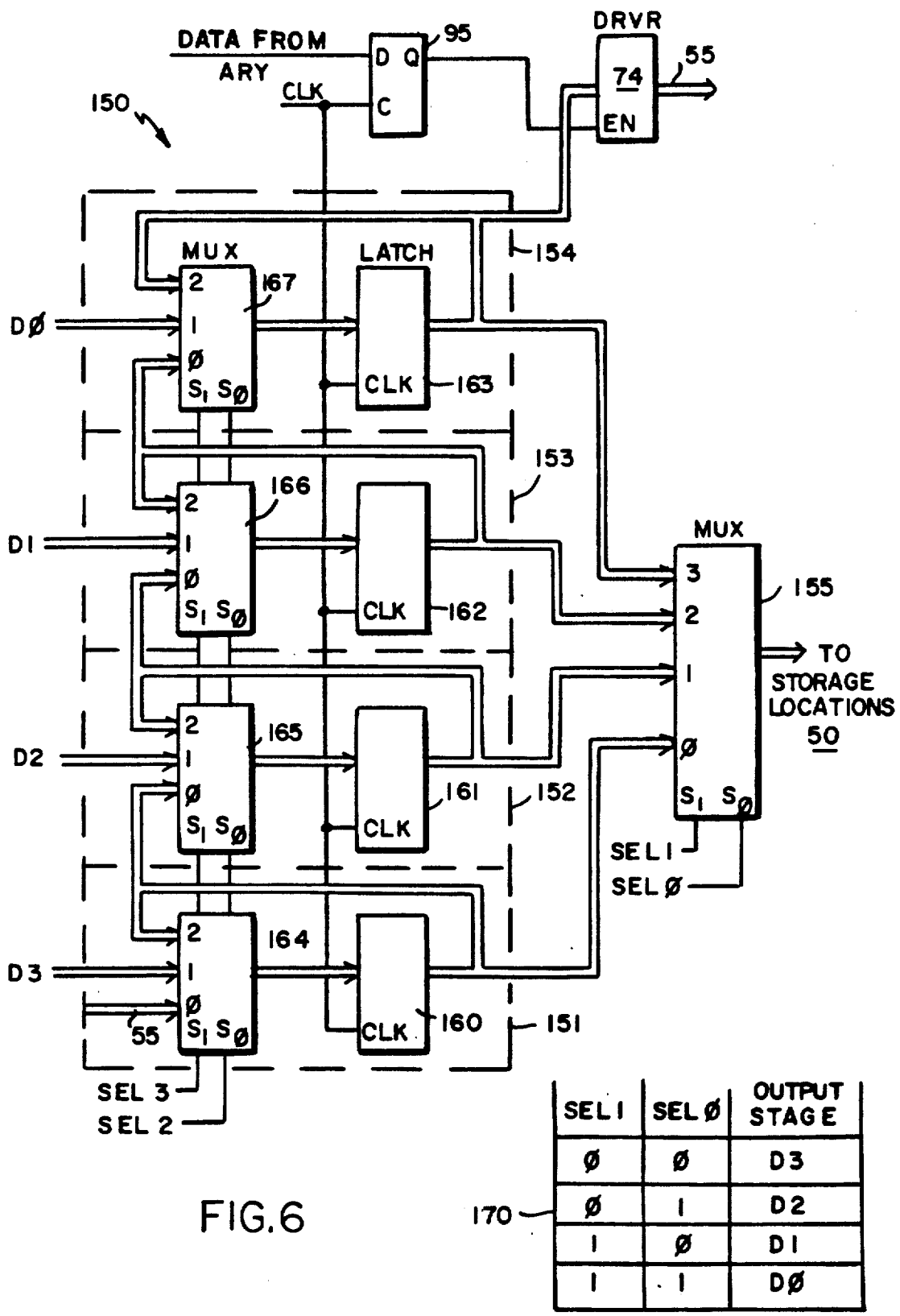
FIG. 6 is a circuit diagram of another data buffer constructed in accordance with the invention.

FIG. 6 depicts another embodiment of the buffer in which the output stage is varied depending on the conditions of the SEL1 and SEL0 control signals (see Table 170). Buffer 150 includes four identical stages 151 through 154, all of which are connected to an output multiplexer 155. The stages 151 through 154 operate under control of the SEL2 and SEL3 control signals to perform the same operations as the stages 111 through 114 of buffer 110 (FIG. 5). Furthermore, buffer 150 includes a driver 74 and a flip-flop 95 for transmitting data over data line 55 to the memory controller 15.

Each of the stages 151 through 154 of buffer 150 includes a latch 160 through 163 for storing a data word and a multiplexer 164 for coupling data words to the respective latches from one of several sources in response to the various conditions of the SEL3 and SEL2 control signals. The operations performed by multiplexers 164 through 167 in response to the SEL2 and SEL3 signals are generally similar to the responses of multiplexers 123 through 126 in response to the corresponding signals, and reference may be made to table 129 (FIG. 5) for those operations. If the SEL3 control signal is asserted and SEL2 control signal is negated, each of the multiplexers 164 through 167 couples the contents of the respective latches for storage back in the same latches, thereby holding the contents in the same stage. On the other hand, if the SEL3 control signal is negated and the SEL2 control signal is asserted, the multiplexers 164 through 167 couple D0 through D3 data signals from the array storage locations 50 (FIG. 3) for storage in the respective latches 160 through 163. Finally, if both the SEL3 and SEL2 control signals are negated, the multiplexers 165 through 167 are enabled to couple the contents of latches 160 through 163 to their respective latches 161 through 163 to enable a shift of the contents of stages 151 through 153 to stages 152 through 154. Simultaneously, multiplexer 164 is enabled to couple the data word on data line 55 for storage in latch 160. Thus, for transfers from array bus 55, stage 151 is always the input stage of the buffer.

Multiplexer 155, however, enables control logic 54 to vary the output stage of the buffer in response to the BLOCK SIZE signal from memory controller 15 as follows:

(A) If the BLOCK SIZE signal indicates a block size of one data word, control logic 54 negates both the SEL1 and SEL0 control signals. In this condition, multiplexer 155 couples the output of latch 160 in stage 151 to storage locations 50.

(B) If the BLOCK SIZE signal indicates a block size of two data words, control logic 54 asserts the SEL0 control signal and negates the SEL1 control signal. In this condition, multiplexer 155 couples the output of latch 161 in stage 152 to storage locations 50.

(C) If the BLOCK SIZE signal indicates a block size of three data words, control logic 54 asserts the SEL1 control signal and negates the SEL0 control signal. In this condition, multiplexers 155 couples the output of latch 162 in stage 153 to storage locations 50.

(D) If the BLOCK SIZE signal indicates a block size of four data words, control logic 54 asserts both the SEL1 and SEL0 control signals. In this condition, multiplexer 155 couples the output of latch 163 in stage 154 to storage locations 50.

It should be noted that the SEL1 and SEL0 control signals do not inhibit the output of the latch in the selected output stage from also being shifted into a next higher stage. This, however, does not effect the operation of the stages between the input stage and the selected output stage.

It is thus apparent that buffers 56 (FIG. 4), 110 (FIG. 5), and 150 (FIG. 6) enable the transfer of blocks of data words of multiple sizes, or numbers of words, between two elements in a data processing system, such that when the block is loaded into the buffer, the first data word is available at the output stage of the buffer. This advantage is present in buffer 56 depicted in FIG. 4 only if the transfers are limited to two words or four words; however, the circuits of buffers 110 and 150 depicted in FIGS. 5 and 6 enable any number of words from one to four to be transferred and achieve the aforementioned advantage.

Although the specific embodiments of the buffer depicted in FIGS. 4 through 6 have been limited to buffers which store four words, it is readily apparent to those skilled in the art that the buffers can be extended to any number of stages, and achieve the benefits of the invention.

The foregoing description has been limited to a specific embodiment of this invention. It will be apparent, however, that the invention can be practiced in systems having diverse basic constructions or that use different internal circuitry than is disclosed in this specification with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A memory array for connection to a memory controller in a digital data processing system, the memory controller transmitting data to and receiving data from said memory array in blocks of iteratively transferred data words, the blocks having preselected numbers of data words up to a predetermined maximum number, said memory controller transmitting memory control signals for controlling storage of data in and retrieval of data from said memory array including address signals and a block size control signal indicating the number of data words in the block, the memory array comprising:
   A. addressable storage means for storing data words, said addressable storage means having an address input terminal for receiving the address signals to identify a storage location, a data input terminal for receiving data words for storage in the location identified by the address signals, and an output terminal for transmitting data words from the location identified by the address signals;
   B. storage buffer means for connection to said memory controller and connected to said addressable storage means for buffering data transferred between said memory controller and said addressable storage means, including a plurality of serially connected stages, the number of stages corresponding at least to the predetermined maximum number of data words in a block, the stages being ordered serially from an input end to a far end and each including data word storing means for storing a data word;
   C. storage buffer input selection means for selectively iteratively coupling data words for storage in each of the data word storing means from either the memory controller or the preceding data word storing means in response to the block size signal from the memory controller, in which said storage buffer input selection means includes:
      multiplexer means connected to said data word storing means for coupling to the input of the data word storing means either the output of the preceding data word storing means or the data words from the memory controller, and
      multiplexer control means for controlling the multiplexer means in response to the block size signal from the memory controller; and
   D. storage buffer output means including a plurality of output driver means each connected to one of said data word storing means for selectively transmitting the contents of said data word storage means for storage in said addressable storage means in response to the block size and address signals from the memory controller.

2. A memory array as defined in claim 1 in which said multiplexer means includes a plurality of multiplexers each for coupling data to one of said data word storing means, said multiplexers having an input terminal connected to the output terminal of the preceding data word storing means and a second input terminal connected to receive data words from the memory controller.

3. A memory array as defined in claim 2 in which said memory controller further transmits cycle control signals indicating the direction of transfer,
   A. said multiplexers further including an input terminal connected to the output terminal of said addressable storage means,
   B. said multiplexer control means enabling said multiplexer means to couple a plurality of data words from said addressable storage means for storage in said data word storing means in response to said cycle control signals indicating a transfer from said memory array to the memory controller, and for thereafter enabling said multipliers to shift said data words to the far end through said transfer means;
   C. said memory array further including array output means connected to the far end data word storing means for coupling data words from the far end data word storing means to said memory controller.

4. A memory array for connection to a memory controller in a digital data processing system, the memory controller transmitting data to and receiving data from said memory array in blocks of iteratively transferred data words, the blocks having preselected numbers of data words up to a predetermined maximum number, in which the block sizes are integral multiples of each other, said memory controller transmitting memory control signals for controlling storage of data in and retrieval of data from said memory array including address signals and a block size control signal indicating the number of data words in the block, the memory array comprising:
   A. addressable storage means for storing data words, said addressable storage means having an address input terminal for receiving the address signals to identify a storage location, a data input terminal for receiving data words for storage in the location identified by the address signals, and an output terminal for transmitting data words from the location identified by the address signals;
   B. storage buffer means for connection to said memory controller and connected to said addressable storage means for buffering data transferred between said memory controller and said addressable storage means, including a plurality of serially connected stages, the number of stages corresponding at least to the predetermined maximum number of data words in a block, the stages being ordered serially from an input end to a far end and each including data word storing means for storing a data word;
   C. storage buffer input selection means for selectively iteratively coupling data words for storage in each of the data word storing means from either the memory controller or the preceding data word storing means in response to the block size signal from the memory controller, said storage buffer input selecting means including:
      transfer means connected to each of said data word storing means for coupling to the input of selected ones of said data word storing means either the output of the preceding data word storing means or the data words from the memory controller, the selection related to the predetermined number of data words in a block, and including multiplexer means for selectively coupling data either from the output of the preceding data word storing means or from the memory controller to the input of selected ones of said data word storing means, and
      transfer control means for controlling the transfer means in response to the block size signal from the memory controller; and D. storage buffer output means including a plurality of output driver means each connected to one of said data word storing means for selectively transmitting the contents of said data word storage means for storage in said addressable storage means in response to the block size and address signals from the memory controller.

5. A memory array as defined in claim 4 in which said memory controller further transmits cycle control signals indicating the direction of transfer,
   A. said transfer means being further connected to selectively couple data words from said addressable storage mans to said data word storing means;
   B. said transfer control means enabling said multiplexer means to couple a plurality of data words from said addressable storage means for storage in said data word storing means in response to said cycle control signals indicating a transfer from said memory array to the memory controller, and for thereafter enabling said multiplexers to shift said data words to the far end through said transfer means;
   C. said memory array further including array output means connected to the far end data word storing means for coupling data words from the far end data word storing means to said memory controller.

6. A memory array as defined in claim 5 in which said transfer means further includes additional multiplexers such that each of said data word storing means has an associated multiplexer means, all of said multiplexers including an input terminal connected to receive data words from said addressable storage locations and selectively couple them to said data word storing means.

7. A memory array as defined in claim 1 in which said multiplexer means comprises a plurality of multiplexers each associated with one of said data word storing means and a demultiplexer having an input terminal connected to receive data words from the memory controller each of said multiplexers being connected to selectively couple the output of said demultiplexer or the output of said preceding data word storing means to the associated data word storing means, said demultiplexer being enabled by said multiplexer control means to couple the data words from the memory controller to a selected one of said multiplexers in response to the block size signal.

8. A memory array for connection to a memory controller in a digital data processing system, the memory controller transmitting data to and receiving data from said memory array in blocks of iteratively transferred data words, the blocks having preselected numbers of data words up to a predetermined maximum number, said memory controller transmitting memory control signals for controlling storage of data in and retrieval of data from said memory array including address signals and a block size control signal indicating the number of data words in the block, the memory array comprising:
   A. addressable storage means for storing data words, said addressable storage means having an address input terminal for receiving the address signals to identify a storage location, a data input terminal for receiving data words for storage in the location identified by the address signals and an output terminal for transmitting data words in the location identified by the address signals;
   B. storage buffer means for connection to said memory controller and connected to said addressable storage mans for buffering data transferred between said memory controller and said addressable storage means, including a plurality of serially connected stages, the number of stages corresponding at least to the predetermined maximum number of data words in a block, the stages being ordered serially from an input end to a far end, each of said stages including:
      i. means for storing a data word including an input terminal for receiving a data word and an output terminal;
      ii. input selection means having:
         (a) an output terminal connected to the input of the storage means of the stage;
         (b) a plurality of input terminals, connected such that
            (1) a first input terminal of said input stage for connection to receive data words from said memory controller and a first input terminal of stages other than said input stage is connected to the output terminal of the storage means of the preceding stage in the series;
            (2) a second input terminal of each stage is connected to the output terminal of said addressable storage means; and
            (b 3) a third input terminal for connection to receive data words from said memory controller, the stages other than the input stage that are selected to have a third input terminal being related to the numbers of words in the blocks; and
         (c) means for selectively coupling signals from one of the input terminals to the output terminal to be stored in the stage's data word storing means in response to buffer control signals; and
      iii. gated output means connected to the output terminal of said data word storing means and said addressable storage locations, said gated output means being controlled by said control means to couple the contents of selected ones of said data word storing means for storage in said addressable storage locations; and
   C. control means connected to said addressable storage means and said storage buffer means for receiving said transfer control signals from said memory controller and for generating buffer control signals in response thereto for controlling all of said input selection means in parallel for enabling data words to be iteratively transferred between said addressable storage locations and said memory controller.

9. A memory array for connection to a memory controller in a digital data processing system, the memory controller transmitting data to and receiving data from said memory array in blocks of iteratively transferred data words, the blocks having preselected numbers of data words up to a predetermined maximum number, said memory controller transmitting memory control signals for controlling storage of data in and retrieval of data from said memory array including address signals and a block size control signal indicating the number of data words in the block, the memory array comprising:
   A. addressable storage means for storing data words, said addressable storage means having an address input terminal for receiving the address signals to identify a storage location, a data input terminal for receiving data words for storage in the location identified by the address signals and an output terminal for transmitting data words in the location identified by the address signals;

B. storage buffer means for connection to said memory controller and connected to said addressable storage means for buffering data transferred between said memory controller and said addressable storage mans, including a plurality of serially connected stages, the number of stages corresponding at least to the predetermined maximum number of data words in a block the stages being ordered serially from an input end to a far end each of said stages including;
  i. means for storing a data word including an input terminal for receiving a data word and an output terminal;
  ii. input selection means having:
    (a) an output terminal connected to the input of the storage means of the stage;
    (b) a plurality of input terminals, connected such that
      (1) a first input terminal of said input stage for connection to receive data words from said memory controller and a first input terminal of stages other than said input stage is connected to the output terminal of the storage means of the preceding stage in the series;
      (2) a second input terminal of each stage is connected to the output terminal of said addressable storage means; and
    (c) means for selectively coupling signals from one of the input terminals to the output terminal to be stored in the stage's data word storing means in response to buffer control signals; and
  iii. gated output means connected to the output terminal of said data word storing means and said addressable storage locations, said gated output means being controlled by said control means to couple the contents of selected ones of said data word storing means for storage in said addressable storage locations;

C. control means connected to said addressable storage means and said storage buffer means for receiving said transfer control signals form said memory controller and for generating buffer control signals in response thereto for controlling all of said input selection means in parallel for enabling data words to be iteratively transferred between said addressable storage locations and said memory controller; and wherein the gated output means is connected to the output terminal of said far end stage and for connection to said memory controller for coupling the contents of the data word storing means to said memory controller in response to a control signal from said control means.

10. A memory array for connection to a memory controller in a digital data processing system, the memory controller transmitting data to and receiving data from said memory array in blocks of iteratively transferred data words, the blocks having preselected numbers of data words up to a predetermined maximum number, said memory controller transmitting memory control signals for controlling storage of data in and retrieval of data from said memory array including address signals and a block size control signal indicating the number of data words in the block, the memory array comprising:

A. addressable storage means for storing data words, said addressable storage means having an address input terminal for receiving the address signals to identify a storage location, a data input terminal for receiving data words for storage in the location identified by the address signals and an output terminal for transmitting data words in the location identified by the address signals;

B. storage buffer means for connection to said memory controller and connected to said addressable storage means for buffering data transferred between said memory controller and said addressable storage means, including a plurality of serially connected stages, the number of stages corresponding at least to the predetermined maximum number of data words in a block, the stages being ordered serially from an input end to a far end, each of said stages including:
  i. means for storing a data word including an input terminal for receiving a data word and an output terminal;
  ii. input selection means having:
    (a) an output terminal connected to the input of the storage means of the stage;
    (b) a plurality of input terminals, connected such that
      (1) a first input terminal of said input stage for connection to receive data words from said memory controller and a first input terminal of stages other than said input stage is connected to the output terminal of the storage means of the preceding stage in the series;
      (2) a second input terminal of each stage is connected to the output terminal of said addressable storage means; and
    (c) means for selectively coupling signals from one of the input terminals to the output terminal to be stored in the stage's data word storing means in response to buffer control signals; and
  iii. gated output means connected to the output terminal of said data word storing means and said addressable storage locations, said gated output means being controlled by said control means to couple the contents of selected ones of said data word storing means for storage in said addressable storage locations;

C. control means connected to said addressable storage means and said storage buffer means for receiving said transfer control signals from said memory controller and for generating buffer control signals in response thereto for controlling all of said input selection means in parallel for enabling data words to be iteratively transferred between said addressable storage locations and said memory controller; and wherein the input selection means includes input demultiplexing means for connection to said memory controller and connected to the first input terminals of said stages for selectively coupling the data words from the memory controller to one of said first input terminals under control of said control means.

11. A memory array for connection to a memory controller in a digital data processing system, the memory controller transmitting data to and receiving data from said memory array in blocks of iteratively transferred data words, the blocks having preselected numbers of data words up to a predetermined maximum number, said memory controller transmitting memory control signals for controlling storage of data in and retrieval of data from said memory array including address signals and a block size control signal indicating the number of data words in the block, the memory array comprising:

A. addressable storage means for storing data words, said addressable storage mans having an address input terminal for receiving the address signals to identify a storage location, a data input terminal for receiving data words for storage in the location identified by the address signals and an output terminal for transmitting data words in the location identified by the address signals;

B. storage buffer means for connection to said memory controller and connected to said addressable storage means for buffering data transferred between said memory controller and said addressable storage means, including a plurality of serially connected stages, the number of stages corresponding at least to the predetermined maximum number of data words in a block, the stages being ordered serially from an input end to a far end, each of said stages including:
  i. means for storing a data word including an input terminal for receiving a data word and an output terminal;
  ii. input selection means having:
    (a) an output terminal connected to the input of the storage means of the stage;
    (b) a plurality of input terminals, connected such that
      (3) a first input terminal of said input stage for connection to receive data words from said memory controller and a first input terminal of stages other than said input stage is connected to the output terminal of the storage means of the preceding stage in the series;
      (2) a second input terminal of said input stage and selected other stages for connection to receive data words from said memory controller, the stages other than the input stage that are selected to have a second input terminal being related to the numbers of words in the blocks; and
      (3) a third input terminal of each stage is connected to the output terminal of said addressable storage means; and
    (c) means for selectively coupling signals from one of the input terminals to the output terminal to be stored in the stage's data word storing means in response to buffer control signals; and C. control means connected to said addressable storage means and said storage buffer means for receiving said transfer control signals from said memory controller and for generating buffer control signals in response thereto for controlling all of said input selection means in parallel for enabling data words to be iteratively transferred between said addressable storage locations and said memory controller; and wherein each stage further comprises gated output means connected to the output terminal of said data word storing means and said addressable storage locations, said gated output means being controlled by said control means to couple the contents of selected ones of said data word storing means for storage in said addressable storage locations.

12. A memory array for connection to a memory controller in a digital data processing system, the memory controller transmitting data to and receiving data from said memory array in blocks of iteratively transferred data words, the blocks having preselected numbers of data words up to a predetermined maximum number, said memory controller transmitting memory control signals for controlling storage of data in and retrieval of data from said memory array including address signals and a block size control signal indicating the number of data words in the block, the memory array comprising:

A. addressable storage means for storing data words, said addressable storage means having an address input terminal for receiving the address signals to identify a storage location, a data input terminal for receiving data words for storage in the location identified by the address signals and an output terminal for transmitting data words in the location identified by the address signals;

B. storage buffer means for connection to said memory controller and connected to said addressable storage means for buffering data transferred between said memory controller and said addressable storage means, including a plurality of serially connected stages, the number of stages corresponding at least to the predetermined maximum number of data words in a block, the stages being ordered serially from an input end to a far end, each of said stages including:
  i. means for storing a data word including an input terminal for receiving a data word and an output terminal;
  ii. input selection means having:
    (a) an output terminal connected to the input of the storage means of the stage;
    (b) a plurality of input terminals, connected such that
      (1) a first input terminal of said input stage for connection to receive data words from said memory controller and a first input terminal of stages other than said input stage is connected to the output terminal of the storage means of the preceding stage in the series;
      (2) a second input terminal of said input stage and selected other stages for connection to receive data words from said memory controller, the stages other than the input stage that are selected to have a second input terminal being related to the numbers of words in the blocks; and
      (3) a third input terminal of each stage is connected to the output terminal of said addressable storage means; and
    (c) means for selectively coupling signals from one of the input terminals to the output terminal to be stored in the stage's data word storing means in response to buffer control signals; and C. control means connected to said addressable storage means and said storage buffer means for receiving said transfer control signals from sad memory controller and for generating buffer control signals in response thereto for controlling all of said input selection means in parallel for enabling data words to be iteratively transferred between said addressable storage locations and said memory controller; and wherein the storage buffer means further comprises gated output means connected to the output terminal of said far end stage and for connection to said memory controller for coupling the contents of the data word storing means to said memory controller in response to a control signal from said control means.

13. A memory array for connection to a memory controller in a digital data processing system, the memory controller transmitting data to and receiving data from said memory array in blocks of iteratively transferred data words, the blocks having preselected numbers of data words up to a predetermined maximum number, said memory controller transmitting memory control signals for controlling storage of data in and retrieval of data from said memory array including address signals and a block size control signal indicating the number of data words in the block, the memory array comprising:

A. addressable storage means for storing data words, said addressable storage means having an address input terminal for receiving the address signals to identify a storage location, a data input terminal for receiving data words for storage in the location identified by the address signals and an output terminal for transmitting data words in the location identified by the address signals;

B. storage buffer means for connection to said memory controller and connected to said addressable storage means for buffering data transferred between said memory controller and said addressable storage means, including a plurality of serially connected stages, the number of stages corresponding at least to the predetermined maximum number of data words in a block, the stages being ordered serially from an input end to a far end, each of said stages including:
  i. means for storing a data word including an input terminal for receiving a data word and an output terminal;
  ii. input selection means having:
    (a) an output terminal connected to the input of the storage means of the stage;
    (b) a plurality of input terminals, connected such that
      (1) a first input terminal of said input stage for connection to receive data words from said memory controller and a first input terminal of stages other than said input stage is connected to the output terminal of the storage means of the preceding stage in the series;
      (2) a second input terminal of said input stage and selected other stages for connection to receive data words from said memory controller, the stages other than the input stage that are selected to have a second input terminal being related to the numbers of words in the blocks; and
      (3) a third input terminal of each stage is connected to the output terminal of said addressable storage means; and
    (c) means for selectively coupling signals from one of the input terminals to the output terminal to be stored in the stage's data word storing means in response to buffer control signals; and C. control means connected to said addressable storage means and said storage buffer means for receiving said transfer control signals from said memory controller and for generating buffer control signals in response thereto for controlling all of said input selection means in parallel for enabling data words to be iteratively transferred between said addressable storage locations and said memory controller; and wherein the input selection means includes input demultiplexing means for connection to said memory controller and connected to the first input terminals of said stages for selectively coupling the data words from the memory controller to one of said first input terminals under control of said control means.

14. A buffer system or use in a memory array for connection to a memory controller in a digital data processing system, the memory controller transmitting data to and receiving data from said memory array in blocks of iteratively transferred data words, the blocks having preselected numbers of data words up to a predetermined maximum number, said memory controller transmitting memory control signals for controlling storage of data in and retrieval of data from said memory array including address signals and a block size control signal indicating the number of data words in the block, the memory array including addressable storage means for storing data Words, said addressable storage means having an address input terminal for receiving the address signals to identify a storage location, a data input terminal for receiving data words for storage in the location identified by the address signals, and an output terminal for transmitting data words from the location identified by the address signals, said buffer system including:

A. storage buffer means for connection to said memory controller and connected to said addressable storage mans for buffering data transferred between said memory controller and said addressable storage means, including a plurality of serially connected stages, the number of stages corresponding at least to the predetermined maximum number of data words in a block, the stages being ordered serially from an input end to a far end and each including data word storing means for storing a data word;

B. storage buffer input selection means for selectively iteratively coupling data words for storage in each of the data word storing means from either the memory controller or the preceding data word storing means in response to the block size signal from the memory controller, in which said storage buffer input selection means includes:
  multiplexer means connected to said data word storing means for coupling to the input of the data word storing means either the output of the preceding data word storing means or the data words from the memory controller, and
  multiplexer control means for controlling the multiplexer means in response to the block size signal from the memory controller; and C. storage buffer output means including a plurality of output driver means each connected to one of said data word storing means for selectively transmitting the contents of said data word storage means for storage in said addressable storage means in response to the block size and address signals from the memory controller.

15. A buffer system as defined in claim 14 in which said multiplexer means includes a plurality of multiplexers each for coupling data to one of said data word storing means, said multiplexers having an input terminal connected to the output terminal of the preceding data word storing means and a second input terminal connected to receive data words from the memory controller.

16. A buffer system as defined in claim 15 in which said memory controller further transmits cycle control signals indicating the direction of transfer,
   A. said multiplexers further including an input terminal connected to the output terminal of said addressable storage means,
   B. said multiplexer control means enabling said multiplexer means to couple a plurality of data words from said addressable storage means for storage in said data word storing means in response to said cycle control signals indicating a transfer from said memory array to the memory controller, and for thereafter enabling said multiplexers to shift said data words to the far end through said transfer means;
   C. said memory array further including array output means connected to the far end data word storing means for coupling data words from the far end data word storing means to said memory controller.

17. A buffer system as define din claim 14 in which the block sizes are integral multiples of each other, said buffer input selection means including:
   A. transfer means connected to each of said data word storing means for coupling data to the input of the data word storing means the output of the preceding data word storing means, the transfer means of selected ones of said data word storing means, the selection related to the predetermined numbers of data words in a block, including multiplexer means for selectively coupling data from the output of the preceding data word storing means or from the memory controller to the input of the respective data word storing means, and
   B. transfer control means for selectively controlling the transfer means in response to the block size signal from the memory controller.

18. A buffer system as defined in claim 17 in which said memory controller further transmits cycle control signals indicating the direction of transfer,
   A. said transfer means being further connected to selectively couple data words from said addressable storage means to said data word storing means;
   B. said transfer control means enabling said multiplexer means to couple a plurality of data words from said addressable storage means for storage in said data word storing means in response to said cycle control signals indicating a transfer from said memory array to the memory controller, and for thereafter enabling said multiplexers to shift said data words to the far end through said transfer means;
   C. said memory array further including array output means connected to the far end data word storing means for coupling data words from the far end data word storing means to said memory controller.

19. A buffer system as defined in claim 18 in which said transfer means further includes additional multiplexers such that each of said data word storing means has an associated multiplexer means, all of said multiplexers including an input terminal connected to receive data words from said addressable storage locations and selectively couple them to said data word storing means.

20. A buffer system as defined in claim 14 in which said multiplexer means comprises a plurality of multiplexers each associated with one of said data word storing means and a demultiplexer having an input terminal connected to receive data words from the memory controller, each of said multiplexers being connected to selectively couple the output of said demultiplexer or the output of said preceding data word storing means to the associated data word storing means, said demultiplexer being enabled by said multiplexer control means to couple the data words from the memory controller to a selected one of said multiplexers in response to the block size signal.

21. A data processing system including a memory array connected to a memory controller in a digital data processing system, the memory controller transmitting data to and receiving data from said memory array in blocks of iteratively transferred data words, the blocks having preselected numbers of data words up to a predetermined maximum number, said memory controller transmitting memory control signals for controlling storage of data in and retrieval of data from said memory array including address signals and a block size control signal indicating the number of data words in the block, the memory array comprising:
   A. addressable storage means for storing data words, said addressable storage means having an address input terminal for receiving the address signals to identify a storage location, data input terminal for receiving data words for storage in the location identified by the address signals and an output terminal for transmitting data words from the location identified by the address signals;
   B. storage buffer means for connection to said memory controller and connected to said addressable storage means for buffering data transferred between said memory controller and said addressable storage means, including a plurality of serially connected stages, the number of stages corresponding at least to the predetermined maximum number of data words in a block, the stages being ordered serially from an input end to a far end and each including data word storing means for storing a data word;
   C. storage buffer input selection means for selectively iteratively coupling data words for storage in each of the data word storing means from either the memory controller or the preceding data word storing means in response to the block size signal from the memory controller, in which said storage buffer input selection means includes:
      multiplexer means connected to each of said data word storing means for coupling data to the input of the data word storing means the output of the preceding data word storing means or the data words from the memory controller, and
      multiplexer control means for controlling the multiplexer means in response to the block size signal from the memory controller; and D. storage buffer output means including a plurality of output driver means each connected to one of said data word storing means for selectively transmitting the contents of said data word storage means for storage in said addressable storage means in response to the block size and address signals from the memory controller.

22. A data processing system as defined in claim 21 in which said multiplexer means includes a plurality of multiplexers each for coupling data to one of said data word storing means, said multiplexers having an input terminal connected to the output terminal of the preceding data word storing means and a second input terminal connected to receive data words from the memory controller.

23. A data processing system as defined in claim 22 in which said memory controller further transmits cycle control signals indicating the direction of transfer,
   A. said multiplexers further including an input terminal connected to the output terminal of said addressable storage means,
   B. said multiplexer control means enabling said multiplexer means to couple a plurality of data words from said addressable storage means for storage in said data word storing means in response to said cycle control signals indicating a transfer from said memory array to the memory controller, and for thereafter enabling said multiplexers to shift said data words to the far end through said transfer means;
   C. said memory array further including array output means connected to the far end data word storing means or coupling data words from the far end data word storing means to said memory controller.

24. A data processing system as defined in claim 21 in which the block sizes are integral multiples of each other, said buffer input selection means including:
   A. transfer means connected to each of said data word storing means for coupling data to the input of the data word storing means the output of the preceding data word storing means, the transfer means of selected ones of said data word storing means, the selection related to the predetermined numbers of data words in a block, including multiplexer means for selectively coupling data from the output of the preceding data word storing means or from the memory controller to the input of the respective data word storing means, and
   B. transfer control means for selectively controlling the transfer means in response to the block size signal from the memory controller.

25. A data processing system as defined in claim 24 in which said memory controller further transmits cycle control signals indicating the direction of transfer,
   A. said transfer means being further connected to selectively couple data words from said addressable storage means to said data word storing means;
   B. said transfer control means enabling said multiplexer means to couple a plurality of data words from said addressable storage means for storage in said data word storing means in response to said cycle control signals indicating a transfer from said memory array to the memory controller, and for thereafter enabling said multiplexers to shift said data words to the far end through said transfer means;
   C. said memory array further including array output means connected to the far end data word storing means for coupling data words from the far end data word storing means to said memory controller.

26. A data processing system as defined in claim 25 in which said transfer means further includes additional multiplexers such that each of said data word storing means has an associated multiplexer means, all of said multiplexers including an input terminal connected to receive data words from said addressable storage locations and selectively couple them to said data word storing means.

27. A data processing system as defined in claim 22 in which said multiplexer means comprises a plurality of multiplexers each associated with one of said data word storing means and a demultiplexer having an input terminal connected to receive data words from the memory controller, each of said multiplexers being connected to selectively couple the output of said demultiplexer or the output of said preceding data word storing means to the associated data word storing means, said demultiplexer being enabled by said multiplexer control means to couple the data words from the memory controller to a selected one of said multiplexers in response to the block size signal.

28. A memory array for use in a data processing system, the data processing system including an array bus for coupling a memory controller to the memory array, wherein the memory controller controls transfer between the memory array and the memory controller of a variable number of data words contained in a data block by transmitting memory control signals on the array bus for the data block, wherein the memory control signals corresponding to the data block include a block size signal to indicate the number of data words contained in the data block and an address signal, wherein the variable number of data words contained in the data blocks does not exceed a predetermined maximum, and wherein the memory array comprises:

a plurality of storage locations for storing input words;

address means, coupled to the plurality of storage locations and the array bus, and responsive to the address signal corresponding to the data block, for selecting a number of storage locations in which the umber of data words contained in the data block are stored;

data buffer means, coupled to the storage locations and the array bus, for buffering the number of data words contained in the data block, wherein the data buffer means includes:

a plurality of buffer stages ordered serially from an input stage to an output stage, wherein the predetermined maximum does not exceed the number of buffer stages, each buffer stage storing one data word and having an input terminal and an output terminal, wherein each buffer stage other than the input stage can receive one data word on its input terminal from a preceding buffer stage and each buffer stage other than the output stage can provide one data word on its output terminal to a following buffer stage;

means for coupling the output terminal of each stage to the plurality of storage locations to enable data words contained in the data block to be loaded into the selected number of storage locations;

means for coupling the input terminal of each stage to the plurality of storage locations to enable data words contained in the data block to be loaded from the selected number of storage locations;

output stage coupling means for coupling the output terminal of the output stage to the array bus to enable serial transfer of data words from the output stage to the array bus;

control means, coupled to the array bus and the data buffer means, for receiving the block size signal, and for providing an input selection signal that selects a buffer stage to be coupled to the array bus to enable serial transfer of data words to the selected stage from the array bus, wherein the selected stage corresponds to the buffer stage that precedes the output stage coupling means by the number of data words contained in the data block; and input selection means, coupled to the control means and the data buffer means, and responsive to the input selection signal, for coupling the input terminal of the selected stage to the array bus, and for coupling the input terminal of each stage following the selected stage to the output terminal of the preceding stage, to enable data words contained in the data block to be serially transferred to the output stage from the array bus without waiting for serial transfers through empty buffer stages at times when the number of data words contained in the data block is less than the number of buffer stages.

29. A memory array for use in a data processing system, the data processing system including an array bus for coupling a memory controller to the memory array, wherein the memory controller controls transfer between the memory array and the memory controller of a variable number of data words contained in a data block by transmitting memory control signals on the array bus for the data block, wherein the memory control signals corresponding to the data block include a block size signal to indicate the number of data words contained in the data block and an address signal, wherein the variable number of data words contained in the data blocks does not exceed a predetermined maximum, and wherein the memory array comprises:

a plurality of storage locations for storing data words;

address means, coupled to the plurality of storage locations and the array bus, and responsive to the address signal corresponding to the data block, for selecting a number of storage locations in which the number of data words contained in the data block are stored;

data buffer means, coupled to the storage locations and the array bus, for buffering the number of data words contained in the data block, wherein the data buffer means includes:

a plurality of buffer stages ordered serially from an input stage to an output stage, wherein the predetermined maximum does not exceed the number of buffer stages, each buffer stage storing one data word and having an input terminal and an output terminal, wherein each buffer stage other than the input stage can receive one data word on its input terminal from a preceding buffer stage and each buffer stage other than the output stage can provide one data word on its output terminal to a following buffer stage;

means for coupling the input terminal of each stage to the plurality of storage locations to enable data words contained in the data block to be loaded from the selected number of storage locations;

input stage coupling means for coupling the input terminal of the input stage to the array bus to enable serial transfer of data words to the input stage from the array bus;

output stage coupling means for coupling the output terminal of the output stage to the array bus to enable serial transfer of data words from the output stage to the array bus;

control means, coupled to the array bus and the data buffer means, for receiving the block size signal, and for providing an output selection signal that selects a buffer stage to be coupled to the plurality of storage locations to enable data word to be loaded from the selected stage into the selected number of storage locations, wherein the selected stage corresponds to the buffer stage that follows the input stage coupling means by the number of data words contained in the data block; and output selection means, coupled to the control means and the data buffer means, and responsive to the output selection signal, for coupling the output terminal of the selected stage to the plurality of storage locations to enable data words contained in the data block to be loaded into the selected number of storage locations from the selected stage without waiting for serial transfers through empty buffer stages at times when the number of data words contained in the data block is less than the number of buffer stages.

* * * * *

UNITED STATES PATENT AND TRADEMARK OFFICE
CERTIFICATE OF CORRECTION

PATENT NO. : 5,038,277   Page 1 of 4
DATED : August 06, 1991
INVENTOR(S) : Barbara H. Altman It is certified that error appears in the above-identified patent and that said Letters Patent is hereby corrected as shown below:

Claim 3, column 12, line 7, change "multipliers" to --multiplexers--.

Claim 4, column 12, line 53, change "selecting" to --selection--.

Claim 5, column 13, line 13, change "mans" to --means--.

Claim 8, column 14, line 1, change "mans" to --means--.

Claim 8, column 14, line 26, change "(b3)" to --(3)--.

Claim 9, column 15, line 7, change "mans" to --means--.

Claim 9, column 15, line 10, after "block" insert --,--.

UNITED STATES PATENT AND TRADEMARK OFFICE
CERTIFICATE OF CORRECTION

PATENT NO. : 5,038,277
DATED : August 06, 1991
INVENTOR(S) : Barbara H. Altman It is certified that error appears in the above-identified patent and that said Letters Patent is hereby corrected as shown below:

Claim 9, column 15, line 11, before "each" insert --,--.

Claim 9, column 15, line 12, after "including" change ";" to --:--.

Claim 9, column 15, line 44, change "form" to --from--.

Claim 11, column 17, line 9, change "mans" to --means--.

Claim 11, column 17, line 34, change "(3)" to --(1)--.

Claim 12, column 18, line 64, change "sad" to --said--.

Claim 14, column 20, line 17, change "or" to --for--.

UNITED STATES PATENT AND TRADEMARK OFFICE
CERTIFICATE OF CORRECTION

PATENT NO. : 5,038,277
DATED : August 06, 1991
INVENTOR(S) : Barbara H. Altman

It is certified that error appears in the above-identified patent and that said Letters Patent is hereby corrected as shown below:

Claim 14, column 20, line 40, change "mans" to --means--.

Claim 17, column 21, line 31, change "define din" to --defined in--.

Claim 21, column 22, line 38, after "location," insert --a--.

Claim 23, column 23, line 33, after "means" change "or" to --for--.

Claim 28, column 24, line 42, change "input" to --data--.

Claim 28, column 24, line 48, change "umber" to --number--.

UNITED STATES PATENT AND TRADEMARK OFFICE
CERTIFICATE OF CORRECTION

PATENT NO. : 5,038,277
DATED : August 6, 1991
INVENTOR(S) : Barbara H. Altman

It is certified that error appears in the above-indentified patent and that said Letters Patent is hereby corrected as shown below:

Claim 29, column 26, line 34, change "word" to --words--.

Signed and Sealed this

Eighth Day of June, 1993

Attest:

MICHAEL K. KIRK

*Attesting Officer*     *Acting Commissioner of Patents and Trademarks*